United States Patent
Merrow et al.

(10) Patent No.: US 8,499,611 B2
(45) Date of Patent: Aug. 6, 2013

(54) DISK DRIVE EMULATOR AND METHOD OF USE THEREOF

(75) Inventors: Brian S. Merrow, Harvard, MA (US); Robert A. Dasilva, Lowell, MA (US)

(73) Assignee: Teradyne, Inc., North Reading, MA (US)

( * ) Notice: Subject to any disclaimer, the term of this patent is extended or adjusted under 35 U.S.C. 154(b) by 665 days.

(21) Appl. No.: 12/246,060

(22) Filed: Oct. 6, 2008

(65) Prior Publication Data
US 2010/0083732 A1    Apr. 8, 2010

(51) Int. Cl.
*G01N 29/30* (2006.01)

(52) U.S. Cl.
USPC .......................................................... 73/1.82

(58) Field of Classification Search
USPC ................. 73/1.82, 865.9, 866.4, 660, 865.6, 73/571, 1.84; 702/182
See application file for complete search history.

(56) References Cited

U.S. PATENT DOCUMENTS

| | | | |
|---|---|---|---|
| 4,601,206 A * | 7/1986 | Watson | 73/510 |
| 6,346,809 B1 | 2/2002 | Karam, II | 324/210 |
| 7,092,251 B1 | 8/2006 | Henry | 361/685 |
| 7,801,700 B2 * | 9/2010 | Gross et al. | 702/182 |
| 2002/0162396 A1 * | 11/2002 | Genix et al. | 73/664 |
| 2002/0196724 A1 * | 12/2002 | Henrichs | 369/75.1 |
| 2007/0253157 A1 | 11/2007 | Atkins et al. | 361/685 |
| 2009/0265136 A1 * | 10/2009 | Garcia et al. | 702/183 |

FOREIGN PATENT DOCUMENTS

| | | |
|---|---|---|
| JP | 1998-064173 | 3/1998 |
| JP | 2002-042446 | 2/2002 |
| JP | 2002-42446 | 2/2002 |
| JP | 2003-317465 | 11/2003 |
| JP | 2006-024326 | 1/2006 |
| JP | 2006024326 | 1/2006 |
| JP | 2006-323946 | 11/2006 |

OTHER PUBLICATIONS

Park Jang Hwan, Korean Intellectual Property Office, Notification of Transmittal of The International Search Report and the Written Opinion of the International Searching Authority, or the Declaration, PCT/US2009/059214, May 4, 2010, 13 pages.
International Preliminary Report on Patentability issued Apr. 12, 2011 in international application No. PCT/US2009/059214.
Office action dated Nov. 1, 2011 received in corresponding Japanese Application No. 2011-502149, and uncertified translation summary, 5 pgs.
Notice of Preliminary Rejection, Korean Patent Application No. 10-2010-7020976. Dec. 20, 2011.
Office action dated Aug. 27, 2012 issue in Chinese application No. 200980111132.9 and uncertified English summary, 8 pgs.
Office action dated Apr. 15, 2013 issued in corresponding Chinese application No. 200980111132.9, 4 pages.

* cited by examiner

*Primary Examiner* — Peter Macchiarolo
*Assistant Examiner* — Tamiko Bellamy
(74) *Attorney, Agent, or Firm* — Fish & Richardson P.C.

(57) ABSTRACT

A disk drive emulator for testing a test slot of a disk drive testing system includes an emulator body, an interface connecter disposed on the emulator body, and at least one vibration sensor disposed on the emulator body. The emulator body comprises a material having a tensile modulus of at least $40 \times 10^6$ Psi.

66 Claims, 5 Drawing Sheets

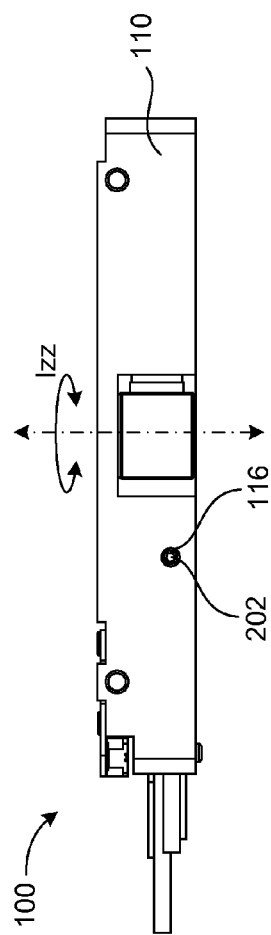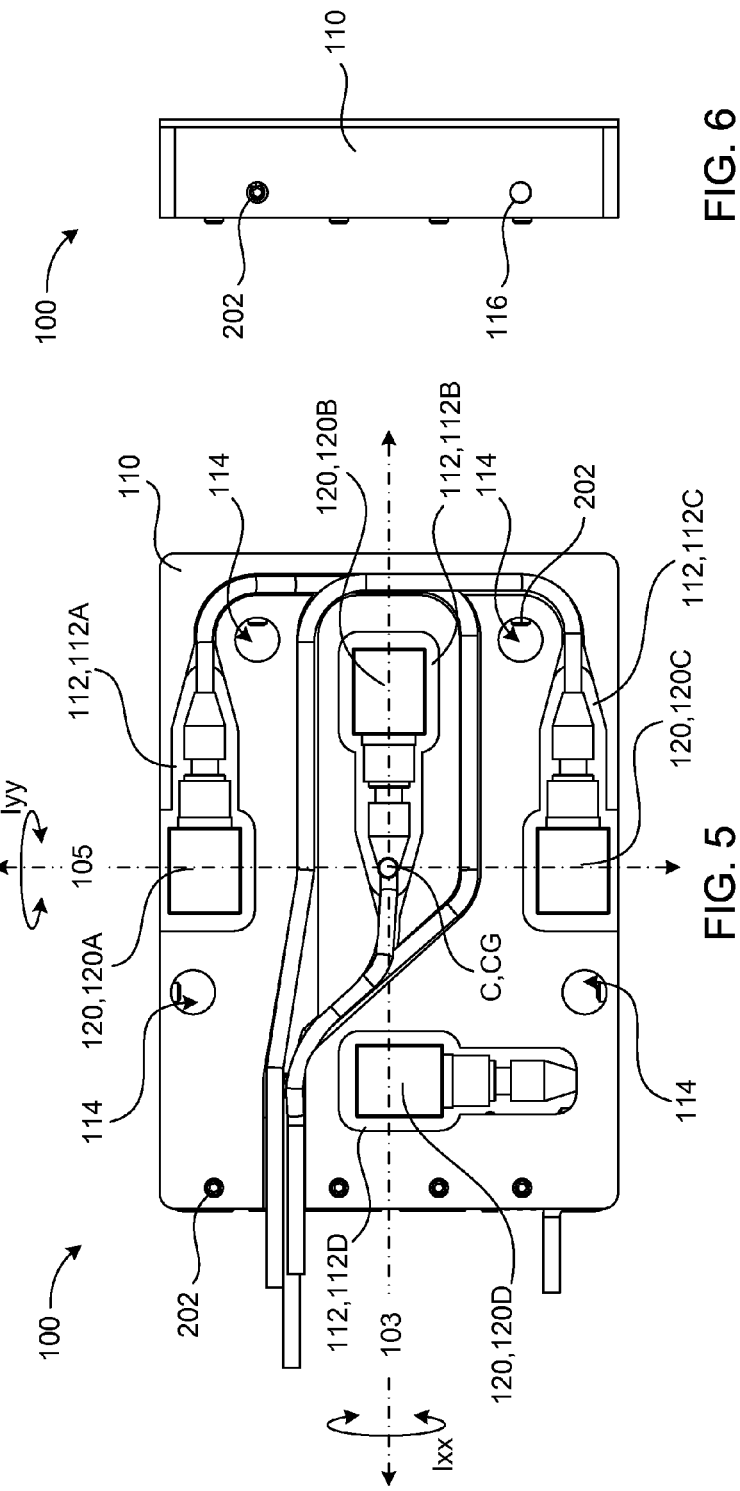

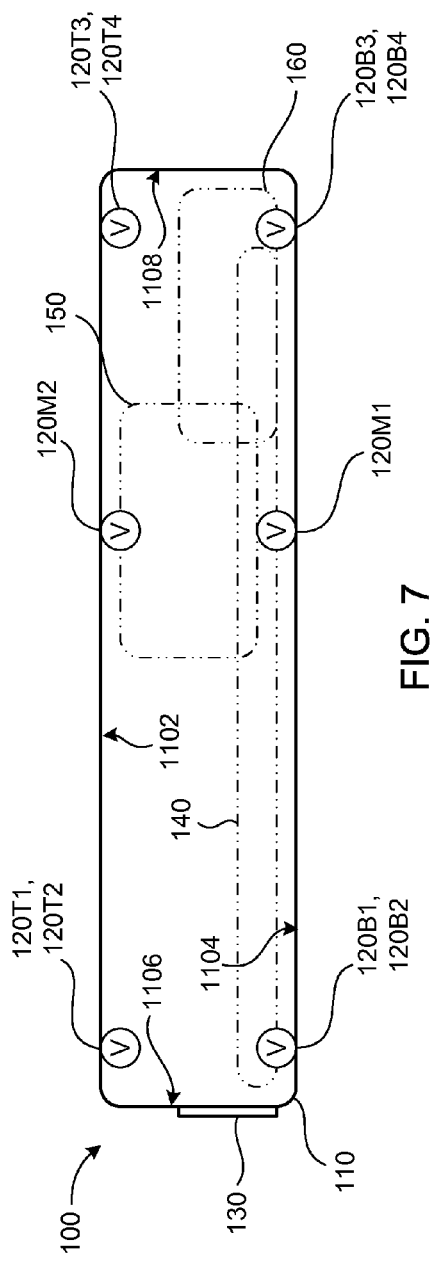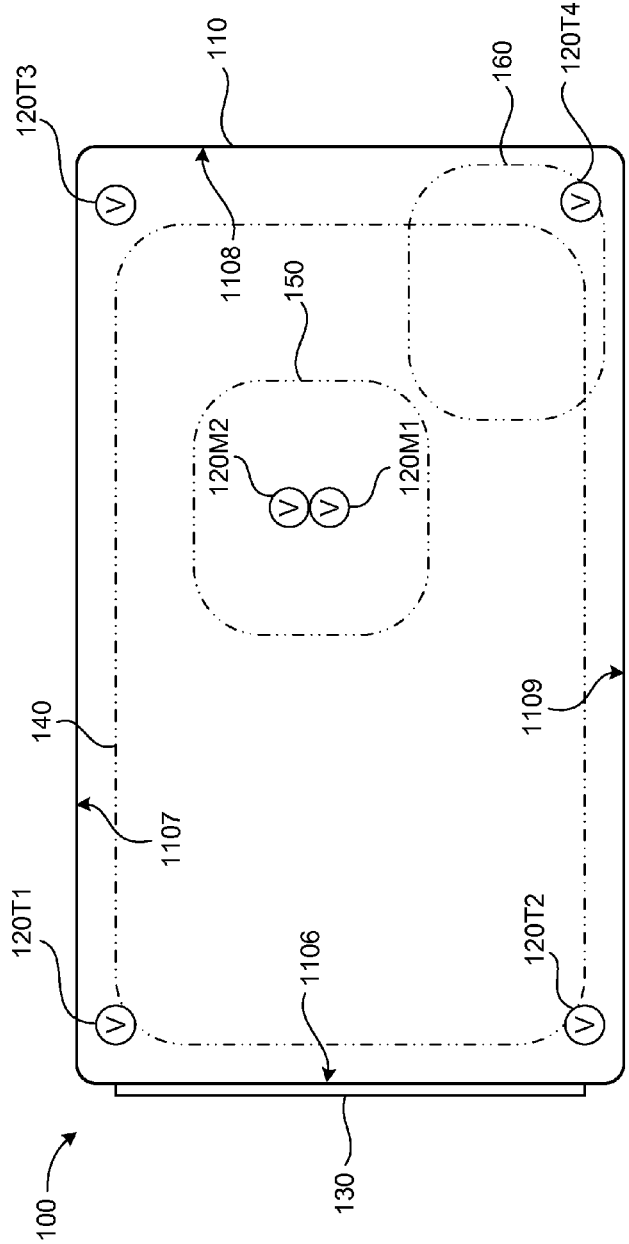

DISK DRIVE EMULATOR AND METHOD OF USE THEREOF

TECHNICAL FIELD

This disclosure relates to disk drive emulators and methods of testing test slots of disk drive testing systems.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously or in batches. Disk drive testing systems typically include one or more racks having multiple test slots that receive disk drives for testing.

The testing environment immediately around the disk drive is closely regulated. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repeatable run-out (NRRO), which may result in lower yields and increased manufacturing costs.

Test slots of disk drive testing systems require routine validation and diagnostic testing to insure that the test slots are functioning and performing properly. In general, a "gold drive" is a disk drive that has been independently validated as functioning and performing properly. The gold drive may be used to test the functionality and performance of test slots. Validating and maintaining verification of the gold drive's veracity is cumbersome and expensive. Furthermore, testing data is limited.

SUMMARY

In one aspect, a disk drive emulator for testing a test slot of a disk drive testing system includes an emulator body, an interface connecter disposed on the emulator body, and at least one vibration sensor disposed on the emulator body. The emulator body comprises a material having a tensile modulus of at least $40 \times 10^6$ Psi.

In another aspect, a method of validating a test slot of a disk drive testing system includes establishing a connection between a disk drive emulator and the test slot and performing testing on the test slot. The testing includes monitoring a vibration level of at least one region of the disk drive emulator. The disk drive emulator includes an emulator body, an interface connecter disposed on the emulator body, and at least one vibration sensor disposed on the emulator body. The emulator body comprises a material having a tensile modulus of at least $40 \times 10^6$ Psi.

In yet another aspect, a disk drive emulator for testing a test slot of a disk drive testing system includes an emulator body, an interface connecter disposed on the emulator body, and at least one vibration sensor disposed on the emulator body. The emulator body includes weight receivers configured to each receive a weight.

Implementations of the disclosure may include one or more of the following features. In some implementations, the emulator body comprises a material having a tensile modulus of at least $85 \times 10^6$ Psi. The emulator body may comprise carbon fiber (e.g., a carbon fiber reinforced epoxy laminate with 60% fiber volume). The emulator body may have a first bending mode at greater than about 8 kHz. In some examples, the disk drive emulator includes first, second, third, and fourth vibration sensors disposed on the emulator body. The vibration sensors may be disposed equidistantly from a center of gravity of the emulator body. The vibration sensors may be spaced about 2 inches (51 mm) along longitudinal and transverse axes defined by the emulator body from an intersection of the longitudinal and transverse axes. In some implementations, the intersection of the longitudinal and transverse axes coincides with at least one of a geometric center of the emulator body and a center of gravity of the emulator body.

In some implementations, the emulator body is substantially rectangular shaped having top and bottom surfaces, a vibration sensor being disposed near each corner of the top and bottom surfaces. For example, the emulator body may have a width of about 70 mm and a height of between about 9.5 mm and about 19 mm. In some implementations, the emulator body defines an electronics region, a motor region, and a head region, with a vibration sensor being disposed in each region. The emulator body may define at least one weight receiver configured to receive a weight. Placement of weights on the emulator body may alter the weight, mass, and/or center of gravity of the emulator body to, for example, simulate a particular real disk drive.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a side view of a disk drive emulator.

FIG. 5 is a top view of a disk drive emulator.

FIG. 6 is a front view of a disk drive emulator.

FIG. 7 is a side schematic view of a disk drive emulator that illustrates exemplary placement of vibration sensors within a body of the disk drive emulator.

FIG. 8 is a top schematic view of the disk drive emulator shown in FIG. 7, illustrating exemplary placement of vibration sensors within the emulator body.

Like reference symbols in the various drawings indicate like elements.

DETAILED DESCRIPTION

Figure 1:
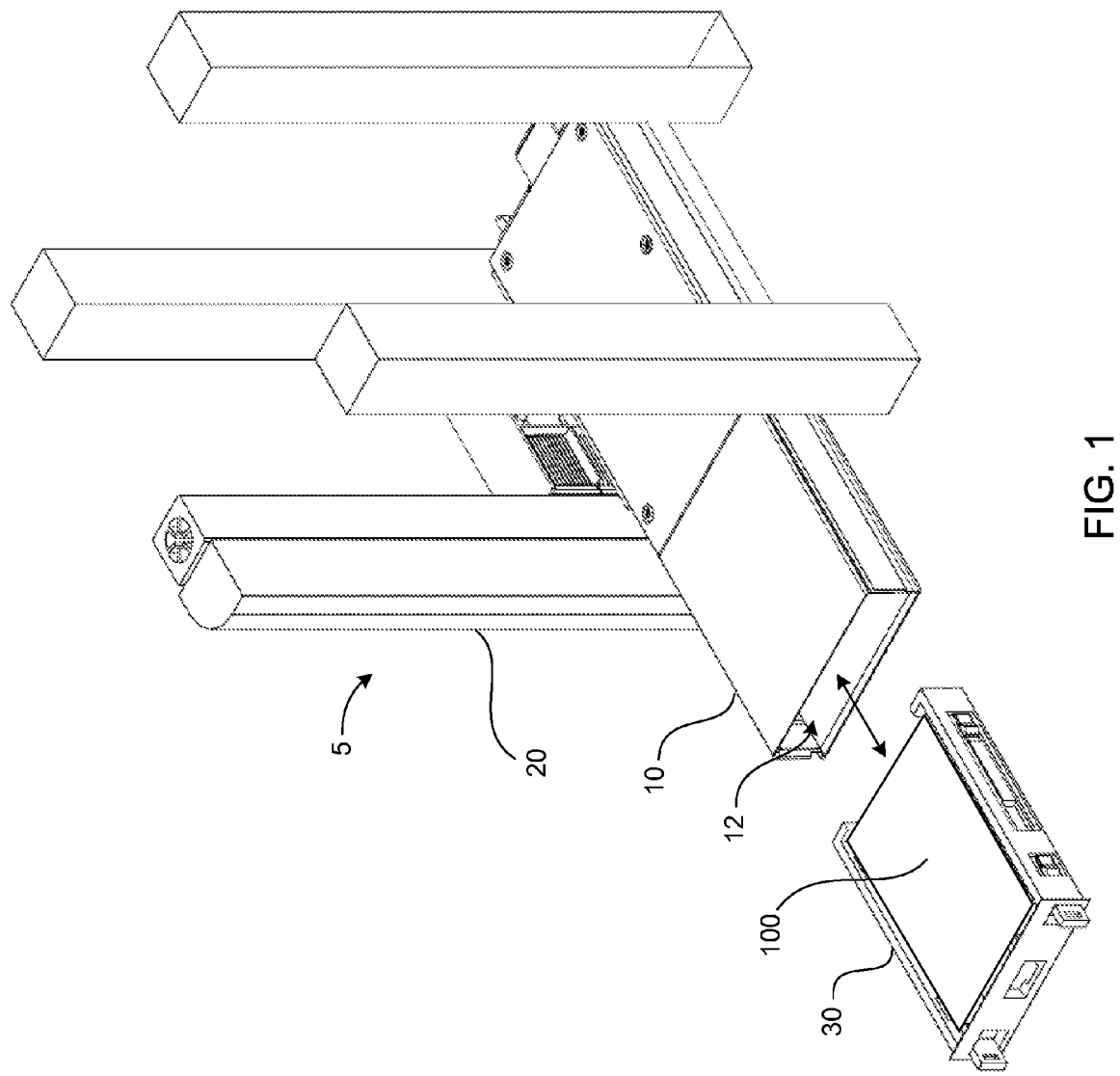
FIG. 1 is a perspective view of a disk drive emulator being inserted into a test slot of a disk drive testing system.
Figure 2:
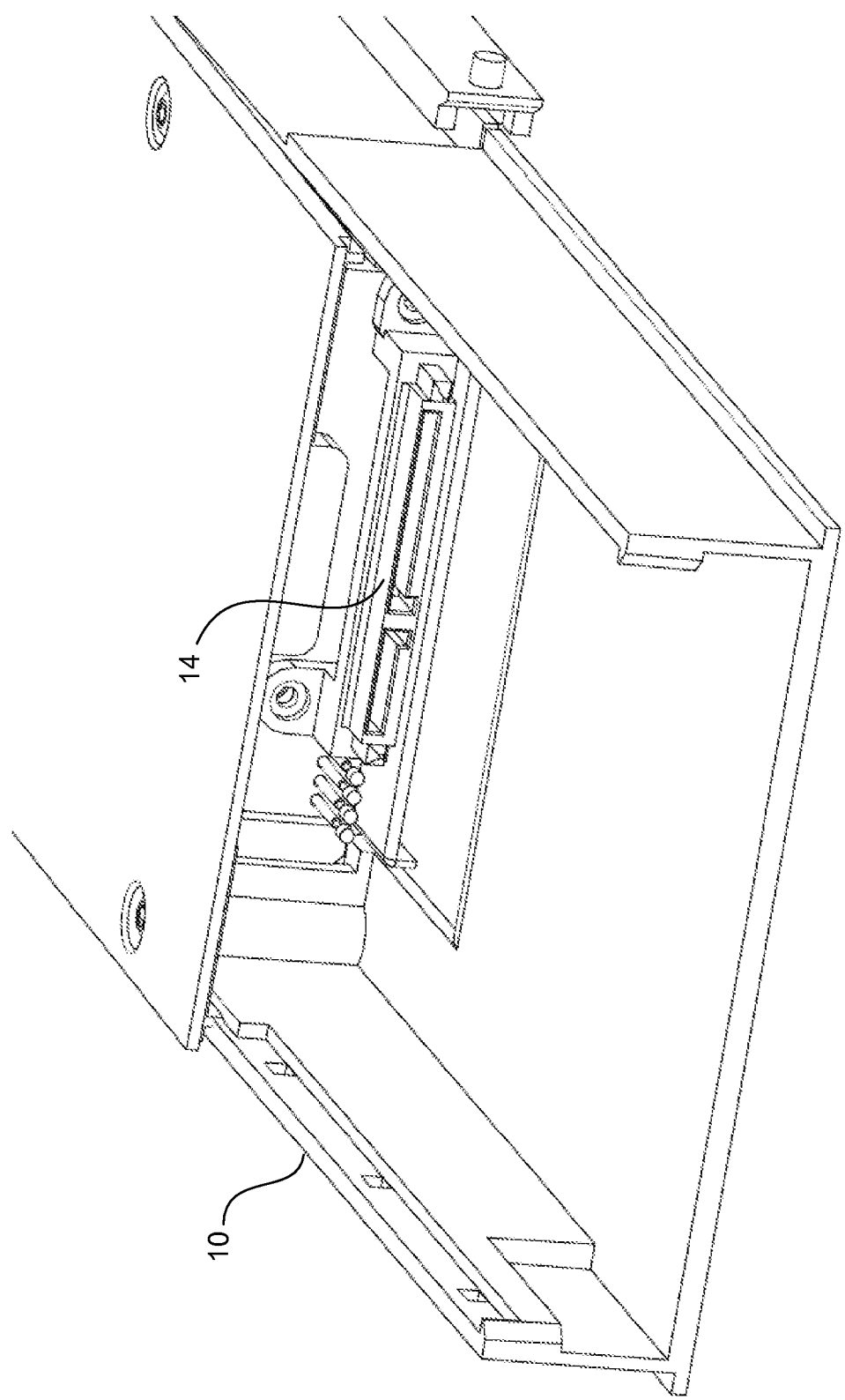
FIG. 2 is a perspective view of a test slot.
Figure 3:
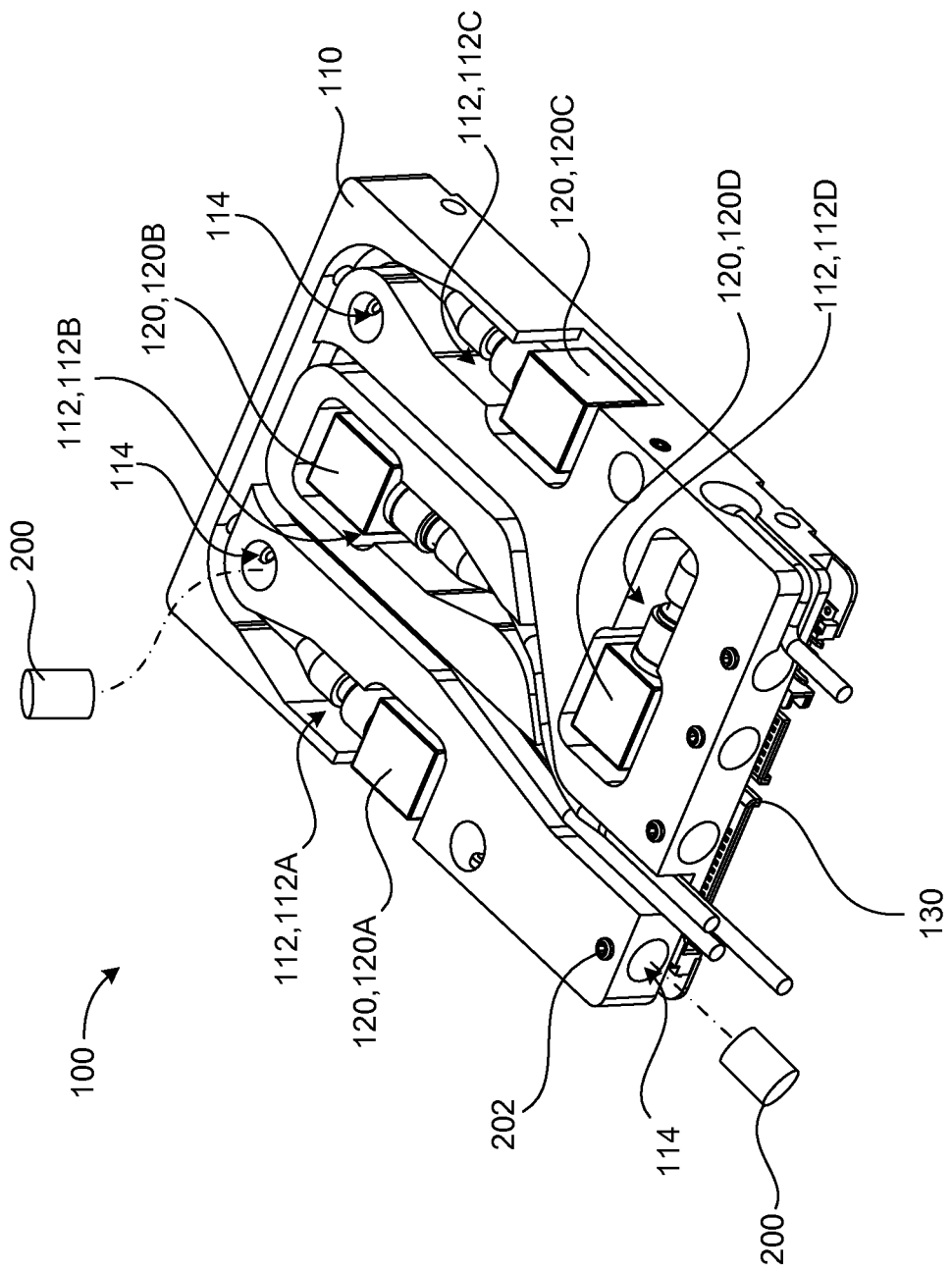
FIG. 3 is a perspective view of a disk drive emulator.

A disk drive emulator 100 emulates or simulates an actual disk drive physically (e.g. in size), but operates as a testing tool for validating test slots 10 of disk drive testing systems 5. In the example shown in FIG. 1, a test slot 10 is mounted to a rack 20. A user may place the disk drive emulator 100 directly into the receptacle 12 of the test slot 10. However, in some examples, a disk drive transporter 30 carries the disk drive emulator 100, and may be manipulated by a user or a robotic arm for insertion into a receptacle 12 of the test slot 10. The disk drive emulator 100 is placed in a test position engaged with a test slot connector 14, shown in FIG. 2.

Referring to FIGS. 3-6, the disk drive emulator 100 includes an emulator body 110, one or more vibration sensors 120 disposed on the emulator body 110, and an interface connecter 130 disposed on the emulator body 110. The emulator body 110 is comprised of a material that exhibits a relatively high stiffness, for example by having a Tensile Modulus (Young's Modulus of Elasticity) of at least 40×10^6 Psi. In some examples, the emulator body 110 has a Tensile Modulus of about or at least 85×10^6 Psi. In some examples, the emulator body 110 is comprised of a carbon fiber reinforced epoxy laminate with 60% fiber volume. The emulator body 110 meets electro-static discharge requirements (e.g., ANSI/ESD S 20.20) due to the high carbon content. In some examples, the first bending mode of the emulator body 110 occurs at greater than 8 kHz. Unlike a typical disk drive body, which is generally comprised of aluminum (e.g., having a tensile modulus of about 10×10^6 Psi) or steel (e.g., having a tensile modulus of about 30×10^6 Psi) having relatively low stiffness's that may amplify or enhance vibrations imparted by the disk drive testing system, the relatively stiff emulator body 110 directly translates the substantially unaltered vibrations to the vibration sensors. This allows the disk drive emulator 100 to measure vibrations experienced by the disk drive emulator 100 while in the test slot 10 without contributing to the vibrations. In one implementation, the emulator body 110 has a first mode of resonance at about 8 kHz or greater, which allows recordation of data from about 10 Hz to about 8 kHz. In another implementation, the emulator body 110 has a first mode of resonance at about 5 kHz or greater, which allows recordation of data up to about 5 kHz. Some typical disk drive bodies resonate at about 400 Hz. In some implementations, the emulator body 110 has a weight of about 0.420 lb (191 g), a mass moment about a center of gravity CG of the emulator body 110, Ixx of about 1.0 lb*in^2 (0.29 gm*m^2), a mass moment about the center of gravity CG, Iyy of about 2.2 lb*in^2 (0.65 gm*m^2), and a mass moment about the center of gravity CG, Izz of about 3.1 lb*in^2 (0.92 gm*m^2).

In some implementations, the emulator body 110 includes or defines at least one weight receiver 114 (e.g., aperture, cavity, and/or fastener, such as a clip) configured to receive a weight 200 to alter the weight, mass, and/or center of gravity of the disk drive emulator 100, for example, to mimic a particular disk drive. Weights 200 may be positioned on the emulator body 110 to provide a particular mass distribution and/or center of gravity of the emulator 100. In some examples, emulator body 110 also defines a threaded hole 116 that intersects (e.g., perpendicular or at an angle to) the weight receiver 114. The threaded hole 116 is configured to receive a set screw 202, which may be used to secure the weight 200 in the weight receiver 114 and/or to alter the weight, mass, and/or center of gravity of the disk drive emulator 100. Other means of fastening or securing the weight 200 in the weight receiver 114 may be used as well, such as, but not limited to, an adhesive, hook and loop fasteners, a clip, interference fit, etc.) In examples shown, the emulator body 110 defines eight weight receivers 114. The weight receivers 114 may be arranged equidistantly from each other in a particular pattern (e.g., polygon, star, etc.) or in certain regions of the emulator body 110 that correspond to areas of an actual disk drive (e.g. a motor region, circuit region, connector region, disk drive head region, etc.). Weights 200 may be added to the emulator body 110 to provide a weight, mass, and/or center of gravity similar to or the same as a particular real disk drive, therefore allowing testing under a simulated environment substantially similar to that of a real disk drive. For example, the weights 200 may replicate the mass, the mass distribution, and/or the center of gravity of a particular disk drive.

In some implementations, the emulator body 110 has a width of about 70 mm and a height of between about 9.5 mm and about 19 mm. The emulator body 110 may be a solid unitary construction and defines a recess 112 for each a vibration sensor 120 (e.g., accelerometer). In other examples, the emulator body 110 may be a shell that houses the vibration sensors 120. In the example shown, the emulator body 110 defines first, second, third, and fourth recesses 112A, 112B, 112C, 112D for receiving first, second, third, and fourth vibration sensors 120A, 120B, 120C, 120D. The vibration sensors 120A, 120B, 120C, 120D are shown as being arranged equidistantly from each other; however, other arrangements are possible, such as placing vibration sensors 120 in certain regions of the emulator body 110 that correspond to areas of an actual disk drive that are prone to experiencing or creating vibrations (e.g. a motor region). In some examples, the vibration sensors 120A, 120B, 120C, 120D are placed in each corner of the emulator body 110, as discussed below with respect with FIGS. 7-8. In the example shown in FIG. 5, the first, second, third, and fourth vibration sensors 120A, 120B, 120C, 120D are disposed on the emulator body 110 and spaced about 2 inches (51 mm) along longitudinal and transverse axes 103, 105 defined by the emulator body 110 from an intersection of the longitudinal and transverse axes 103, 105, which may coincide with a geometric center C or a center of gravity CG of the emulator body 110. As mentioned above, weights 200 may be attached to the emulator body 110 to alter the center of gravity CG (e.g., moving the center gravity CG from the geometric center C of the emulator body 110).

In the examples illustrated in FIGS. 7-8, the emulator body 110 has inside top and bottom surfaces 1102, 1104, an inside front surface 1106 supporting the interface connector 130, an inside back surface 1108, and inside left and right side surfaces 1107 and 1109. The vibration sensors 120 may be positioned in the emulator body 110 in locations corresponding to locations of an actual disk drive that typically generate and/or experience vibrations. FIGS. 7-8 illustrate exemplary placements of the vibration sensors 120 inside the emulator body 110. Two vibration sensors 120T1, 120T2 are positioned on the inside top body surface 1102 near each corner adjacent the inside front body surface 1106. Similarly, two vibration sensors 120B1, 120B2 are positioned on the inside bottom body surface 1104 near each corner adjacent the inside front body surface 1106. One vibration sensor 120M1 is positioned on the inside bottom body surface 1104 in an electronics region 140. One vibration sensor 120M2 is positioned on the inside top body surface 1102 in a motor region 150. Vibration sensors 120T4 and 120B4, which are positioned in the corners on the inside top body surface 1102 and bottom body surface 1104, respectively are also in a head region 160. Vibration sensors 120 may be placed in other locations as well, which may or may not correspond to regions of components in a real disk drive for recording data.

The vibration sensor 120 is configured to measure vibrations experienced by the emulator body 110. In some implementations, the vibration sensor 120 is a tri-axial accelerometer (e.g., measures movement along three axes), while in other implementations, the vibration sensor 120 is a single-axis accelerometer to measure vibrations along a particular axis. A pair of vibration sensors 120 may be used to calculate rotary vibrations. In some examples, the vibration sensors 120 can measure six degrees of freedom of movement (e.g., X, Y, Z, $\theta_X$, $\theta_Y$, $\theta_Z$). Examples of accelerometers that may be used include an Endevco Tri-ax 6612A TEDS accelerometer available by Endevco of San Juan Capistrano, Calif., and a Dytran Tri-ax 3233A seismic type accelerometer available by Dytran of Chatsworth, Calif. The Endevco Tri-ax 6612A TEDS accelerometer provides moderate 100 mV/G sensitivity, 1 Hz to 10 kHz response range, ±200 G peak, and 25 kHz resonance. The Dytran Tri-ax 3233A accelerometer provides good 1000 mV/G sensitivity, 0.4 to 3000 Hz response range, ±5 G peak, and 20 kHz resonance.

Referring again to FIGS. 2-3, the interface connecter 130 is configured to mate with the test slot connector 14, and may be a universal asynchronous receiver/transmitter connector. The interface connecter 130 provides a mechanical connection point with the test slot 10 to emulate a real disk drive, but does not provide any communication between the test slot 10 and the disk drive emulator 100. The disk drive emulator 100, in some examples, is configured to have the same mechanical connections points and/or points of contact with the test slot 10 as a real disk drive. This allows the disk drive emulator 100 to measure vibrations under conditions most similar to that experienced by a real disk drive.

A method of validating a test slot 10 of a disk drive testing system 5 includes establishing a connection between a disk drive emulator 100 and the test slot 10, and performing diagnostic testing on the test slot 10 (e.g. via the vibration sensor(s) 120 of the disk drive emulator 100 described above). The diagnostic testing includes monitoring a vibration level of at least one region of the disk drive emulator 100.

A number of implementations have been described. Nevertheless, it will be understood that various modifications may be made without departing from the spirit and scope of the disclosure. Accordingly, other implementations are within the scope of the following claims.

What is claimed is:

1. A disk drive emulator for testing a test slot of a disk drive testing system, the disk drive emulator comprising:
    an emulator body for insertion into the test slot;
    an interface connecter disposed on the emulator body, wherein the interface connector is for providing a mechanical connection point between the emulator body and the test slot when the emulator body is inserted into the test slot; and
    at least two vibration sensors disposed on the emulator body for measuring vibrations imparted by the disk drive testing system to the emulator body, wherein the at least two vibration sensors are disposed on the emulator body equidistantly from a center of gravity of the emulator body;
    wherein the emulator body comprises a material having a tensile modulus of at least $40 \times 10^6$ Psi; and
    wherein the disk drive emulator is configured to emulate a disk drive inserted into the test slot during testing of the test slot.

2. The disk drive emulator of claim 1, wherein the emulator body comprises a material having a tensile modulus of at least $85 \times 10^6$ Psi.

3. The disk drive emulator of claim 1, wherein the emulator body comprises carbon fiber.

4. The disk drive emulator of claim 1, wherein the emulator body has a bending mode at greater than about 8 kHz.

5. The disk drive emulator of claim 1, wherein the at least two vibration sensors comprise first and second vibration sensors; and
    wherein the disk drive emulator further comprises third and fourth vibration sensors that are disposed on the emulator body equidistantly from the center of gravity of the emulator body.

6. The disk drive emulator of claim 1, wherein the at least two vibration sensors comprise first and second vibration sensors; and
    wherein the disk drive emulator further comprises third and fourth vibration sensors that are disposed on the emulator body and that are spaced about 2 inches (51 mm) along longitudinal and transverse axes defined by the emulator body from an intersection of the longitudinal and transverse axes.

7. The disk drive emulator of claim 6, wherein the intersection of the longitudinal and transverse axes coincides with at least one of a geometric center of the emulator body and the center of gravity of the emulator body.

8. The disk drive emulator of claim 1, wherein the emulator body is substantially rectangular shaped having top and bottom surfaces, a vibration sensor being disposed near each corner of the top and bottom surfaces.

9. The disk drive emulator of claim 1, wherein the emulator body defines an electronics region, a motor region, and a head region, a vibration sensor being disposed in each region.

10. The disk drive emulator of claim 1, wherein the emulator body defines at least one weight receiver configured to receive a weight.

11. A method of validating a test slot of a disk drive testing system, the method comprising:
    establishing a connection between a disk drive emulator and the test slot; and
    performing diagnostic testing on the test slot, the diagnostic testing comprising monitoring a vibration level of at least one region of the disk drive emulator;
    wherein the disk drive emulator comprises:
        an emulator body for insertion into the test slot;
        an interface connecter disposed on the emulator body, wherein the interface connecter is for establishing the connection and for providing a mechanical connection point between the emulator body and the test slot when the emulator body is inserted into the test slot; and
        at least two vibration sensors disposed on the emulator body, wherein the at least two vibration sensors are for monitoring the vibration level, and wherein the at least vibration sensors are disposed on the emulator body equidistantly from a center of gravity of the emulator body;
    wherein the emulator body comprises a material having a tensile modulus of at least $40 \times 10^6$ Psi; and
    wherein the disk drive emulator is configured to emulate a disk drive inserted into the test slot during testing of the test slot.

12. The method of claim 11, wherein the emulator body comprises a material having a tensile modulus of at least $85 \times 10^6$ Psi.

13. The method of claim 11, wherein the emulator body comprises carbon fiber.

14. The method of claim 11, wherein the emulator body has a bending mode at greater than about 8 kHz.

15. The method of claim 11, wherein the at least two vibration sensors comprise first and second vibration sensors; and
    wherein the disk drive emulator further comprises third and fourth vibration sensors that are disposed on the emulator body equidistantly from the center of gravity of the emulator body.

16. The method of claim 11, wherein the at least two vibration sensors comprise first and second vibration sensors; and
    wherein the disk drive emulator further comprises third and fourth vibration sensors that are disposed on the emulator body and that are spaced about 2 inches (51 mm) along longitudinal and transverse axes defined by the emulator body from an intersection of the longitudinal and transverse axes.

17. The method of claim 16, wherein the intersection of the longitudinal and transverse axes coincides with at least one of a geometric center of the emulator body and the center of gravity of the emulator body.

18. The method of claim 11, wherein the emulator body is substantially rectangular shaped having top and bottom surfaces, a vibration sensor being disposed near each corner of the top and bottom surfaces.

19. The method of claim 11, wherein the emulator body defines an electronics region, a motor region, and a head region, a vibration sensor being disposed in each region.

20. The method of claim 11, wherein the emulator body defines at least one weight receiver configured to receive a weight.

21. A disk drive emulator for testing a test slot of a disk drive testing system, the disk drive emulator comprising:
an emulator body;
an interface connecter disposed on the emulator body; and
at least one vibration sensor disposed on the emulator body;
wherein the emulator body includes weight receivers configured to each receive a weight.

22. The disk drive emulator of claim 21, wherein the emulator body comprises a material having a tensile modulus of at least 85×10^6 Psi.

23. The disk drive emulator of claim 21, wherein the emulator body comprises carbon fiber.

24. The disk drive emulator of claim 21, wherein the emulator body has a bending mode at greater than about 8 kHz.

25. The disk drive emulator of claim 21, wherein the at least one vibration sensor comprises a first vibration sensor; and
wherein the disk drive emulator further comprises second and third vibration sensors that are disposed on the emulator body equidistantly from a center of gravity of the emulator body.

26. The disk drive emulator of claim 21, wherein the at least one vibration sensor comprises a first vibration sensor; and
wherein the disk drive emulator further comprises second and first, second and third vibration sensors that are disposed on the emulator body and that are spaced about 2 inches (51 mm) along longitudinal and transverse axes defined by the emulator body from an intersection of the longitudinal and transverse axes.

27. The disk drive emulator of claim 26, wherein the intersection of the longitudinal and transverse axes coincides with at least one of a geometric center of the emulator body and a center of gravity of the emulator body.

28. The disk drive emulator of claim 21, wherein the emulator body is substantially rectangular shaped having top and bottom surfaces, a vibration sensor being disposed near each corner of the top and bottom surfaces.

29. The disk drive emulator of claim 21, wherein the emulator body defines an electronics region, a motor region, and a head region, a vibration sensor being disposed in each region.

30. A disk drive testing system comprising:
a test slot; and
a disk drive emulator configured to emulate a disk drive inserted into the test slot during testing of the test slot, the disk drive emulator comprising:
an emulator body for insertion into the test slot;
an interface connecter disposed on the emulator body, wherein the interface connector is for providing a mechanical connection point between the emulator body and the test slot when the emulator body is inserted into the test slot; and
at least two vibration sensors disposed on the emulator body for measuring vibrations imparted by the disk drive testing system to the emulator body.

31. The disk drive testing system of claim 30, wherein the emulator body comprises a material having a tensile modulus of at least 85×10^6 Psi.

32. The disk drive testing system of claim 30, wherein the emulator body has a bending mode at greater than about 8 kHz.

33. The disk drive testing system of claim 30, wherein the at least two vibration sensors are disposed on the emulator body equidistantly from a center of gravity of the emulator body.

34. The disk drive testing system of claim 30, wherein the at least two vibration sensors are spaced about 2 inches (51 mm) along longitudinal and transverse axes defined by the emulator body from an intersection of the longitudinal and transverse axes.

35. The disk drive testing system of claim 34, wherein the intersection of the longitudinal and transverse axes coincides with at least one of a geometric center of the emulator body and a center of gravity of the emulator body.

36. The disk drive testing system of claim 30, wherein the emulator body is substantially rectangular shaped having top and bottom surfaces, a vibration sensor being disposed near each corner of the top and bottom surfaces.

37. The disk drive testing system of claim 30, wherein the emulator body defines an electronics region, a motor region, and a head region, a vibration sensor being disposed in each region.

38. The disk drive testing system of claim 30, wherein the emulator body defines at least one weight receiver configured to receive a weight.

39. A method of validating a test slot of a disk drive testing system, the method comprising:
establishing a connection between a disk drive emulator and the test slot; and
performing diagnostic testing on the test slot, the diagnostic testing comprising monitoring a vibration level of at least one region of the disk drive emulator;
wherein the disk drive testing system comprises:
the test slot; and
the disk drive emulator, wherein the disk drive emulator comprises:
an emulator body for insertion into the test slot;
an interface connecter disposed on the emulator body, wherein the interface connecter is for establishing the connection and for providing a mechanical connection point between the emulator body and the test slot when the emulator body is inserted into the test slot; and
at least two vibration sensors disposed on the emulator body, wherein the at least two vibration sensors are for monitoring the vibration level;
wherein the disk drive emulator is configured to emulate a disk drive inserted into the test slot during testing of the test slot.

40. The method of claim 39, wherein the emulator body comprises a material having a tensile modulus of at least 85×10^6 Psi.

41. The method of claim 39, wherein the emulator body has a bending mode at greater than about 8 kHz.

42. The method of claim 39, wherein the at least two vibration sensors are disposed on the emulator body equidistantly from a center of gravity of the emulator body.

43. The method of claim 39, wherein the at least two vibration sensors are spaced about 2 inches (51 mm) along longitudinal and transverse axes defined by the emulator body from an intersection of the longitudinal and transverse axes.

44. The method of claim 43, wherein the intersection of the longitudinal and transverse axes coincides with at least one of a geometric center of the emulator body and a center of gravity of the emulator body.

45. The method of claim 39, wherein the emulator body is substantially rectangular shaped having top and bottom surfaces, a vibration sensor being disposed near each corner of the top and bottom surfaces.

46. The method of claim 39, wherein the emulator body defines an electronics region, a motor region, and a head region, a vibration sensor being disposed in each region.

47. The method of claim 39, wherein the emulator body defines at least one weight receiver configured to receive a weight.

48. A disk drive emulator for testing a test slot of a disk drive testing system, the disk drive emulator comprising:
   an emulator body for insertion into the test slot;
   an interface connecter disposed on the emulator body, wherein the interface connector is for providing a mechanical connection point between the emulator body and the test slot when the emulator body is inserted into the test slot; and
   at least two vibration sensors disposed on the emulator body for measuring vibrations imparted by the disk drive testing system to the emulator body;
   wherein the disk drive emulator is configured to emulate a disk drive inserted into the test slot during testing of the test slot.

49. The disk drive emulator of claim 48, wherein the emulator body has a height of between about 9.5 mm and about 19 mm.

50. The disk drive emulator of claim 48, wherein the emulator body comprises carbon fiber.

51. The disk drive emulator of claim 48, wherein the emulator body has a bending mode at greater than about 8 kHz.

52. The disk drive emulator of claim 48, wherein the at least two vibration sensors are disposed on the emulator body equidistantly from a center of gravity of the emulator body.

53. The disk drive emulator of claim 48, wherein the at least two vibration sensors are spaced about 2 inches (51 mm) along longitudinal and transverse axes defined by the emulator body from an intersection of the longitudinal and transverse axes.

54. The disk drive emulator of claim 53, wherein the intersection of the longitudinal and transverse axes coincides with at least one of a geometric center of the emulator body and a center of gravity of the emulator body.

55. The disk drive emulator of claim 48, wherein the emulator body is substantially rectangular shaped having top and bottom surfaces, a vibration sensor being disposed near each corner of the top and bottom surfaces.

56. The disk drive emulator of claim 48, wherein the emulator body defines an electronics region, a motor region, and a head region, a vibration sensor being disposed in each region.

57. The disk drive emulator of claim 48, wherein the emulator body defines at least one weight receiver configured to receive a weight.

58. A method of validating a test slot of a disk drive testing system, the method comprising:
   establishing a connection between a disk drive emulator and the test slot; and
   performing diagnostic testing on the test slot, the diagnostic testing comprising monitoring a vibration level of at least one region of the disk drive emulator;
   wherein the disk drive emulator comprises:
     an emulator body for insertion into the test slot;
     an interface connecter disposed on the emulator body, wherein the interface connecter is for establishing the connection and for providing a mechanical connection point between the emulator body and the test slot when the emulator body is inserted into the test slot; and
     at least two vibration sensors disposed on the emulator body, wherein the at least two vibration sensors are for monitoring the vibration level;
   wherein the disk drive emulator is configured to emulate a disk drive inserted into the test slot during testing of the test slot.

59. The method of claim 58, wherein the emulator body has a height of between about 9.5 mm and about 19 mm.

60. The method of claim 58, wherein the emulator body has a bending mode at greater than about 8 kHz.

61. The method of claim 58, wherein the at least two vibration sensors are disposed on the emulator body equidistantly from a center of gravity of the emulator body.

62. The method of claim 58, wherein the at least two vibration sensors are spaced about 2 inches (51 mm) along longitudinal and transverse axes defined by the emulator body from an intersection of the longitudinal and transverse axes.

63. The method of claim 62, wherein the intersection of the longitudinal and transverse axes coincides with at least one of a geometric center of the emulator body and a center of gravity of the emulator body.

64. The method of claim 58, wherein the emulator body is substantially rectangular shaped having top and bottom surfaces, a vibration sensor being disposed near each corner of the top and bottom surfaces.

65. The method of claim 58, wherein the emulator body defines an electronics region, a motor region, and a head region, a vibration sensor being disposed in each region.

66. The method of claim 58, wherein the emulator body defines at least one weight receiver configured to receive a weight.

* * * * *

UNITED STATES PATENT AND TRADEMARK OFFICE
CERTIFICATE OF CORRECTION

PATENT NO.        : 8,499,611 B2                                    Page 1 of 1
APPLICATION NO.   : 12/246060
DATED             : August 6, 2013
INVENTOR(S)       : Brian S. Merrow et al.

It is certified that error appears in the above-identified patent and that said Letters Patent is hereby corrected as shown below:

In the Claims

In column 5, line 45, In Claim 1, delete "40×10^6 Psi;" and insert -- $40 \times 10^6$ Psi; --, therefor.

In column 5, line 51, In Claim 2, delete "85×10^6 Psi." and insert -- $85 \times 10^6$ Psi. --, therefor.

In column 6, line 41, In Claim 11, delete "40×10^6 Psi;" and insert -- $40 \times 10^6$ Psi; --, therefor.

In column 6, line 47, In Claim 12, delete "85×10^6 Psi." and insert -- $85 \times 10^6$ Psi. --, therefor.

In column 7, line 26, In Claim 22, delete "85×10^6 Psi. " and insert -- $85 \times 10^6$ Psi. --, therefor.

In column 7, line 40, In Claim 26, before "third" delete "first, second and".

In column 8, line 6, In Claim 31, delete "85×10^6 Psi." and insert -- $85 \times 10^6$ Psi. --, therefor.

In column 8, line 60, In Claim 40, delete "85×10^6 Psi." and insert -- $85 \times 10^6$ Psi. --, therefor.

Signed and Sealed this
First Day of October, 2013

Teresa Stanek Rea
*Deputy Director of the United States Patent and Trademark Office*